United States Patent [19]

Lick

[11] 3,990,690

[45] Nov. 9, 1976

[54] CORE CHUCKING ASSEMBLY

[75] Inventor: Robert E. Lick, Collingswood, N.J.

[73] Assignee: E. I. Du Pont de Nemours and Company, Wilmington, Del.

[22] Filed: Sept. 8, 1975

[21] Appl. No.: 611,216

[52] U.S. Cl. .............................. 269/48.1; 279/2 R
[51] Int. Cl.² ........................................ B23Q 3/14
[58] Field of Search ...................... 269/48.1; 279/2

[56] References Cited
UNITED STATES PATENTS

| | | | |
|---|---|---|---|
| 2,767,676 | 10/1956 | Johnson et al. | 269/48.1 |
| 3,031,995 | 5/1962 | Taylor | 269/48.1 |
| 3,311,383 | 3/1967 | Cox | 279/2 |
| 3,360,276 | 12/1967 | Peffer | 279/2 |
| 3,434,709 | 3/1969 | Ramsay | 269/48.1 |
| 3,463,499 | 8/1969 | Mott et al. | 279/2 |

FOREIGN PATENTS OR APPLICATIONS

| | | | |
|---|---|---|---|
| 326,105 | 3/1919 | Germany | 279/2 |
| 183,486 | 2/1963 | Sweden | 279/2 |

*Primary Examiner*—Al Lawrence Smith
*Assistant Examiner*—Robert C. Watson

[57] ABSTRACT

A film core is mounted on a mandrel by utilizing two telescoping sleeves. The inner sleeve is keyed to the mandrel to prevent its rotation about the mandrel is frusto-conical in shape and threaded at the smaller end. The outer sleeve, which fits between the core and the inner sleeve, has an inner tapered surface adapted to engage the frusto-conical inner sleeve. A ring nut engages the threaded inner sleeve and when tightened forces the outer sleeve, which is split, to expand and the inner sleeve, which also is split, to contract. In this manner the core is locked to the mandrel.

4 Claims, 3 Drawing Figures

CORE CHUCKING ASSEMBLY

BACKGROUND OF THE INVENTION

This invention relates to a chucking device and, more particularly, to an assembly for mounting a core on a mandrel.

In the manufacture and the utilization of web material, such as rolls of paper, film, plastic and the like, it is necessary that the web of material be wound on or unwound from a hollow cylindrical core. This core must somehow be quickly and easily mountable upon a mandrel which may be free spinning or driven with or without a clutching system.

There have been many quick mounting or chucking systems developed and used, but these systems unfortunately tend to become expensive, complicated, and in many cases, somewhat difficult to use. Furthermore, many such systems can be used only upon a given diameter core. If another diameter core is to be used, several or more of the parts comprising the chucking assembly must be replaced. Another problem encountered with these prior art chucking assemblies is that often a wrench is required in order to sufficiently tighten the assembly such that the core is locked tightly onto the mandrel.

Accordingly, it is an object of this invention to obviate many of the disadvantages of the prior art core chucking assemblies.

Another object of this invention is to provide an improved core chucking assembly that is easy to use.

A futher object of this invention is to provide an improved core chucking assembly that can be used with different sized cores.

SUMMARY OF THE INVENTION

A core chucking assembly is constructed in accordance with this invention for mounting a core on a mandrel. The assembly includes a partly frusto-conical inner sleeve fitted on the mandrel and threaded at its smaller end. The sleeve is adapted to fit with the frusto-conical end within one end of the sleeve. An outer split sleeve is fitted between the inner sleeve and the core with the outer sleeve having an inner frusto-c0nical surface adapted to engage the frusto-conical inner sleeve. A nut is threaded onto the smaller end of the inner sleeve. It may be tightened to effect relative opposite axial movement between the sleeves, thereby to expand the outer sleeve to engage the core and thereby lock the core to the inner sleeve.

The inner core may be similarly locked to the mandrel by splitting the inner sleeve such that it may contract to engage the mandrel. The inner sleeve may be keyed to the mandrel to prevent its rotation. A three point contact may be provided between the inner and outer sleeves to reduce binding. Finally, the outer sleeve may be supplied with different annular thicknesses so that it can accommodate different diameter cores without having to change any of the other parts of the assembly.

BRIEF DESCRIPTION OF THE DRAWINGS

Further advantages and features of this invention will become apparent upon consideration of the following description wherein.

DESCRIPTION OF THE PREFERRED EMBODIMENT

Figure 1:
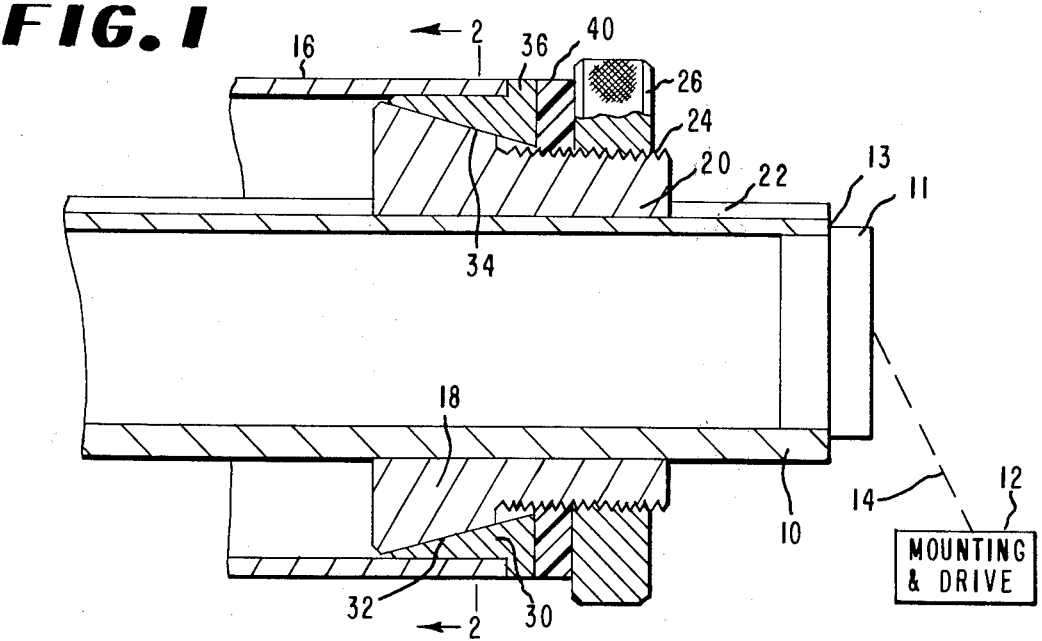
FIG. 1 is a partial block and partial cross sectional view of a core chucking assembly constructed in accordance with a preferred embodiment of this invention.
Figure 2:
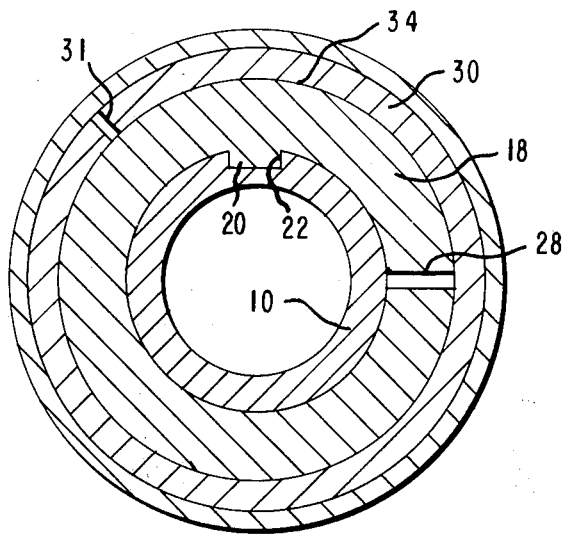
FIG. 2 is a cross sectional view taken along the section line 2—2 of FIG. 1.

In FIGS. 1 and 2 there may be seen a mandrel 10 which in this instance may be hollow. This mandrel may be suitably mounted at each end by suitable bearings, thrust, roller or other, such as described in U.S. Pat. No. 3,881,234 issued May 6, 1975, and driven by a suitable drive means of conventional type. The mounting may include, for example, a plug 11 having a stepped portion 13, the plug being friction fitted into the ends of the mandrel 10. The mounting and drive means is depicted by the block 12 with a drive linkage being depicted by the dashed line 14. Since any suitable mounting may be used and since they do not form a part of this invention the mounting and drive means are not shown in detail.

According to this invention a core 16 upon which may be wound any typical web material such as paper, plastic, film and the like, may be mounted or demounted quickly and easily on the mandrel by a four part chucking assembly. This chucking assembly includes an inner sleeve 18 having an axially directed key 20 adapted to engage a longitudinal slot 22 formed in the exterior of the mandrel 10. In this manner the inner sleeve may be moved axially along the mandrel but may not rotate about the mandrel. The exterior of the sleeve is frusto-conical in shape so as to provide a conical outer bearing surface 32 at one end of the sleeve. The other end of the sleeve, the smaller end, is threaded as at 24 so as to accommodate a ring nut 26. This inner sleeve 18 is split as at 28 to permit it to contract and grip the mandrel as will be described hereinafter. The frusto-conical end of the inner sleeve fits within one end of the core and inside the outer sleeve 30. It also facilitates use with cores that are somewhat out of round.

To complete the assembly a split outer sleeve 30, the split being denoted at 31, is adapted to be fitted over the inner sleeve between the inner sleeve and the open end of the core 16. It has a frusto-conical or tapered inner configuration or inner surface 34 so as to mate with the frusto-conical outer surface 32. The larger end of the outer sleeve 30 may be stepped or flanged as at 36 to engage the end of the core 16. A washer 40 may be positioned over the threaded end of the inner sleeve 18 between the ring nut 26 and the outer sleeve 30.

Figure 3:
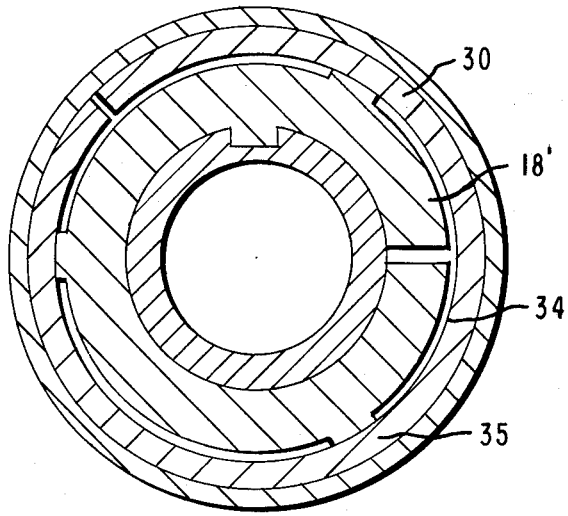
FIG. 3 is a cross sectional view of an alternative embodiment using lands for a bearing surface to reduce binding.

In a preferred form of the invention the inner sleeve outer bearing surface 32 may be formed to have three equally spaced axial protuberances or lands 35 (FIG. 3). In this manner it makes a three point contact with the outer sleeve 30 and has less tendency to bind. As an alternative the inner bearing surface 34 of the outer sleeve may be formed to have axial lands (not shown) of the type 35 described in connection with the bearing surface 32. In this event the outer bearing surface 32 is smooth.

The washer and the ring nut preferably may be made of a self-lubricating plastic material of any well known type. The other parts may be made of metal, but preferably are made of rigid plastic or other suitable material such as glass fiber reinforced self-lubricating plastic such as that made of nylon and 33% glass fibers sold under the trademark Zytel by E. I. du Pont de Nemours and Company, Wilmington, Del. They need not be self-lubricating however.

In operation, the outer sleeve is fitted over the inner sleeve and followed by the washer and the ring nut. This assembly is placed on the mandrel and the core installed over the outer sleeve. By hand tightening the ring nut 26 (for this purpose it may be knurled), the inner sleeve is withdrawn from the core, thereby forcing the conical bearing surfaces 32 and 34 axially in opposite directions. Since both sleeves are split the outer sleeve will expand so as to engage the inner surface of the film core and the inner sleeve will contract so as to engage the mandrel. In this manner the film core sleeves and mandrel are tightly locked together. The nut may be tightened by a wrench or other tool if desired, but this normally is not needed and is not preferred. Hand tightening is all that is necessary.

The core may be removed by reversing the above steps and simply loosening the ring nut 26 to loosen the sleeves and slide the chucking assembly out of the core end. The inner sleeve may be solid and not split if desired so that it may slide axially along the mandrel. The flange 36 may be omitted if desired. Also, the inner sleeve need not be keyed to the mandrel, but may act as a friction clutch in the event of overload, etc.

There has thus been described a relatively simple, easy to use, chucking device comprising only four parts capable of quickly mounting and demounting a core on a mandrel. By interchanging only one part, different sized cores can be accommodated. Different mandrels can be accommodated by changing the annulus of the inner sleeve bearing surface although this modification often requires a corresponding change of the ring nut and washer. By the use of the split sleeves and the lands, cores that are somewhat out of round often can be accommodated.

I claim:

1. A core chucking assembly for mounting a core on a mandrel comprising, in combination:
   a partly frusto-conical inner sleeve adapted to be fitted on said mandrel and exteriorly threaded at the smaller end, said inner sleeve adapted to fit with its frusto-conical end within one end of said core,
   an outer split sleeve adapted to be fitted between said inner sleeve and said core having an inner frusto-conical configuration adapted to engage said frusto-conical inner sleeve, and
   a nut threaded on said smaller end of the inner sleeve adapted to effect relative axial movement between said sleeves, thereby to expand said outer sleeve to engage said core and lock said core to said inner sleeve.

2. A core chucking assembly according to claim 1 wherein said inner sleeve is keyed to said mandrel.

3. A core chucking assembly according to claim 1 wherein said inner sleeve is split, thereby to contract and engage said mandrel.

4. A core chucking assembly according to claim 1 wherein said inner sleeve is split, thereby to contact and grip said mandrel.

* * * * *